US011287045B2

(12) United States Patent
McCaffrey et al.

(10) Patent No.: US 11,287,045 B2
(45) Date of Patent: Mar. 29, 2022

(54) SEAL RING

(71) Applicant: UNITED TECHNOLOGIES CORPORATION, Farmington, CT (US)

(72) Inventors: Michael G. McCaffrey, Windsor, CT (US); John R. Farris, Bolton, CT (US); Theodore W. Hall, Berlin, CT (US); John J. Korzendorfer, Glastonbury, CT (US); Elizabeth F. Vinson, Broad Brook, CT (US); Jeffrey Michael Jacques, East Hartford, CT (US); John E. Paul, Portland, CT (US); Ross Wilson, South Glastonbury, CT (US); Edwin Otero, Southington, CT (US); Alan W. Stoner, Manchester, TN (US)

(73) Assignee: Raytheon Technologies Corporation, Farmington, CT (US)

( * ) Notice: Subject to any disclaimer, the term of this patent is extended or adjusted under 35 U.S.C. 154(b) by 458 days.

(21) Appl. No.: 16/243,632

(22) Filed: Jan. 9, 2019

(65) Prior Publication Data

US 2020/0025293 A1   Jan. 23, 2020

Related U.S. Application Data

(62) Division of application No. 14/852,918, filed on Sep. 14, 2015, now abandoned.
(Continued)

(51) Int. Cl.
*F16J 15/44* (2006.01)
*F01D 11/02* (2006.01)

(52) U.S. Cl.
CPC ............ *F16J 15/441* (2013.01); *F01D 11/025* (2013.01); *F16J 15/442* (2013.01); *F16J 15/445* (2013.01)

(58) Field of Classification Search
CPC ........ F16J 15/441; F16J 15/442; F16J 15/445; F01D 11/025
See application file for complete search history.

(56) References Cited

U.S. PATENT DOCUMENTS 4,932,207 A * 6/1990 Harris ..................... F01D 11/00
                                                          415/170.1
5,154,577 A   10/1992 Kellock et al.
(Continued)

FOREIGN PATENT DOCUMENTS

EP    2551492     1/2013
GB    277806      9/1927
(Continued)

OTHER PUBLICATIONS

USPTO, First Action Interview Office Action dated Aug. 16, 2018 in U.S. Appl. No. 14/852,918.
(Continued)

*Primary Examiner* — Vishal A Patel
(74) *Attorney, Agent, or Firm* — Snell & Wilmer L.L.P.

(57) ABSTRACT

A seal ring system is provided. The seal ring system comprises a segment defining a slot, a pedal along the slot, and an opening offset from the slot. A retention fastener may be disposed in the opening. A seal ring system is also provided comprising a first segment defining a first opening, a second segment defining a second opening, and a retention fastener extending through the first and second openings. The retention fastener configured to allow relative radial movement of the first segment and the second segment. A seal is further provided comprising a seal ring having a central axis, a petal extending radially inward with respect to the central axis of
(Continued)

the seal ring, and a sealing disk axially proximate the seal ring. The sealing disk may have a seal shoe configured as a primary seal. The petal may extend toward the seal shoe.

6 Claims, 12 Drawing Sheets

Related U.S. Application Data

(60) Provisional application No. 62/066,643, filed on Oct. 21, 2014.

(56) References Cited

U.S. PATENT DOCUMENTS

| | | | |
|---|---|---|---|
| 5,249,920 | A | 10/1993 | Andrew et al. |
| 6,347,508 | B1 | 2/2002 | Smallwood et al. |
| 7,216,871 | B1 * | 5/2007 | Datta ................ F01D 11/02 277/411 |
| 7,744,093 | B2 | 6/2010 | McMillan |
| 7,900,461 | B2 * | 3/2011 | Varney ................ F02C 7/28 60/800 |
| 8,596,973 | B2 | 12/2013 | Grondahl |
| 8,752,395 | B2 | 6/2014 | McCormick et al. |
| 2006/0097457 | A1 | 5/2006 | Flaherty |
| 2008/0106046 | A1 | 5/2008 | Datta et al. |
| 2010/0011780 | A1 | 1/2010 | Edwards et al. |
| 2013/0259660 | A1 * | 10/2013 | Dale ................ F01D 11/001 415/170.1 |
| 2014/0062024 | A1 | 3/2014 | Bidkar et al. |
| 2014/0117624 | A1 * | 5/2014 | Bidkar ................ F16J 15/447 277/350 |
| 2014/0119912 | A1 * | 5/2014 | Bidkar ................ F16J 15/442 415/229 |

FOREIGN PATENT DOCUMENTS

| | | |
|---|---|---|
| GB | 866636 | 4/1961 |
| GB | 2092242 | 8/1982 |
| WO | 2014103446 | 7/2014 |

OTHER PUBLICATIONS

European Patent Office, European Search Report dated Dec. 17, 2019 in Application No. 19211608.5.
USPTO: Requirement for Restriction / Election Issued in U.S. Appl. No. 14/852,918 dated Apr. 6, 2018.
USPTO: Pre-Interview First Office Action Issued in U.S. Appl. No. 14/852,918 dated Jul. 19, 2018.
USPTO: Final Office Action Issued in U.S. Appl. No. 14/852,918 dated Oct. 29, 2018.
USPTO: Advisory Action Issued in U.S. Appl. No. 14/852,918 dated Dec. 18, 2018.
EPO: Extended European Search Report dated May 6, 2016 in European Application No. 15190344.0.
EPO: Communication Pursuant to Article 94(3) EPC, in European Application No. 15190344.0 dated Dec. 8, 2017.
EPO: Extended Office Action dated Jun. 14, 2018 in European Application No. 15190344.0.
EPO: Extended Office Action dated Nov. 28, 2018 in European Application No. 15190344.0.

* cited by examiner

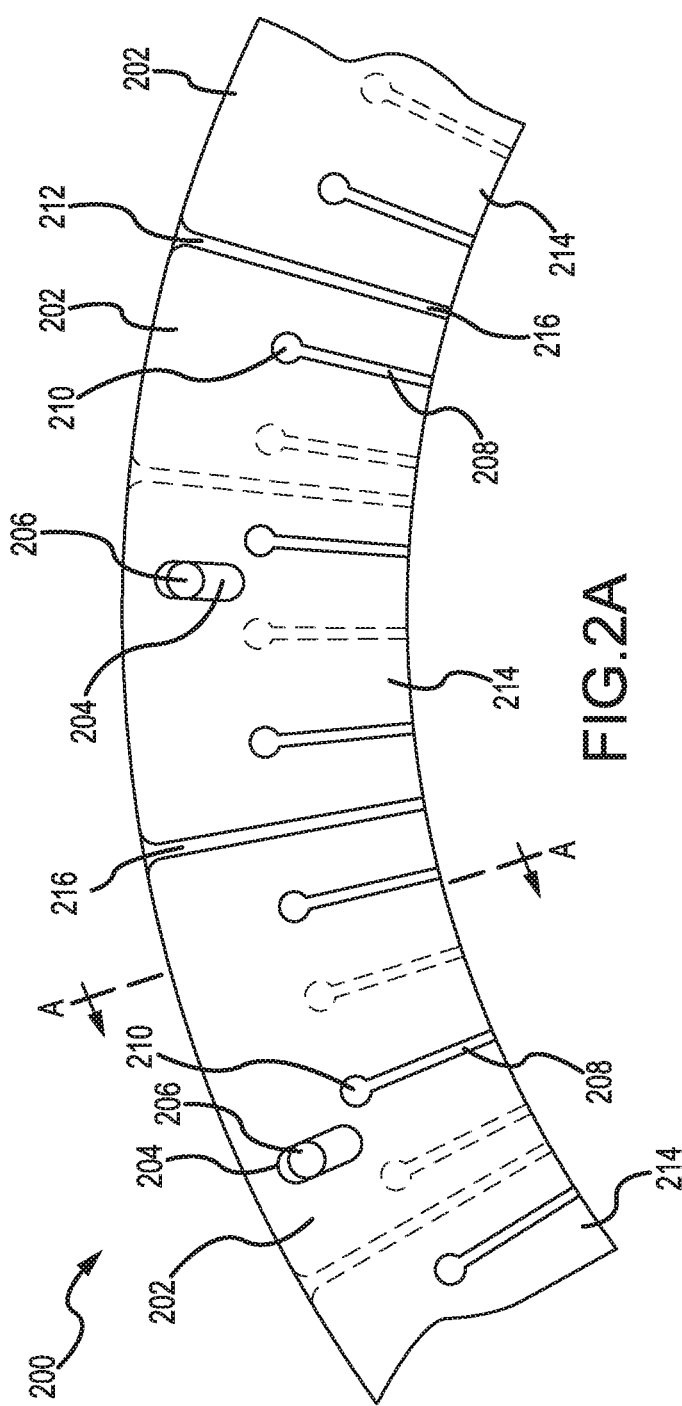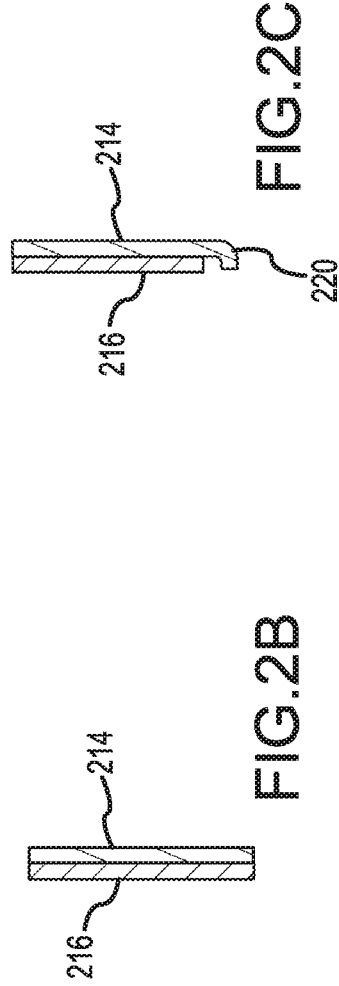

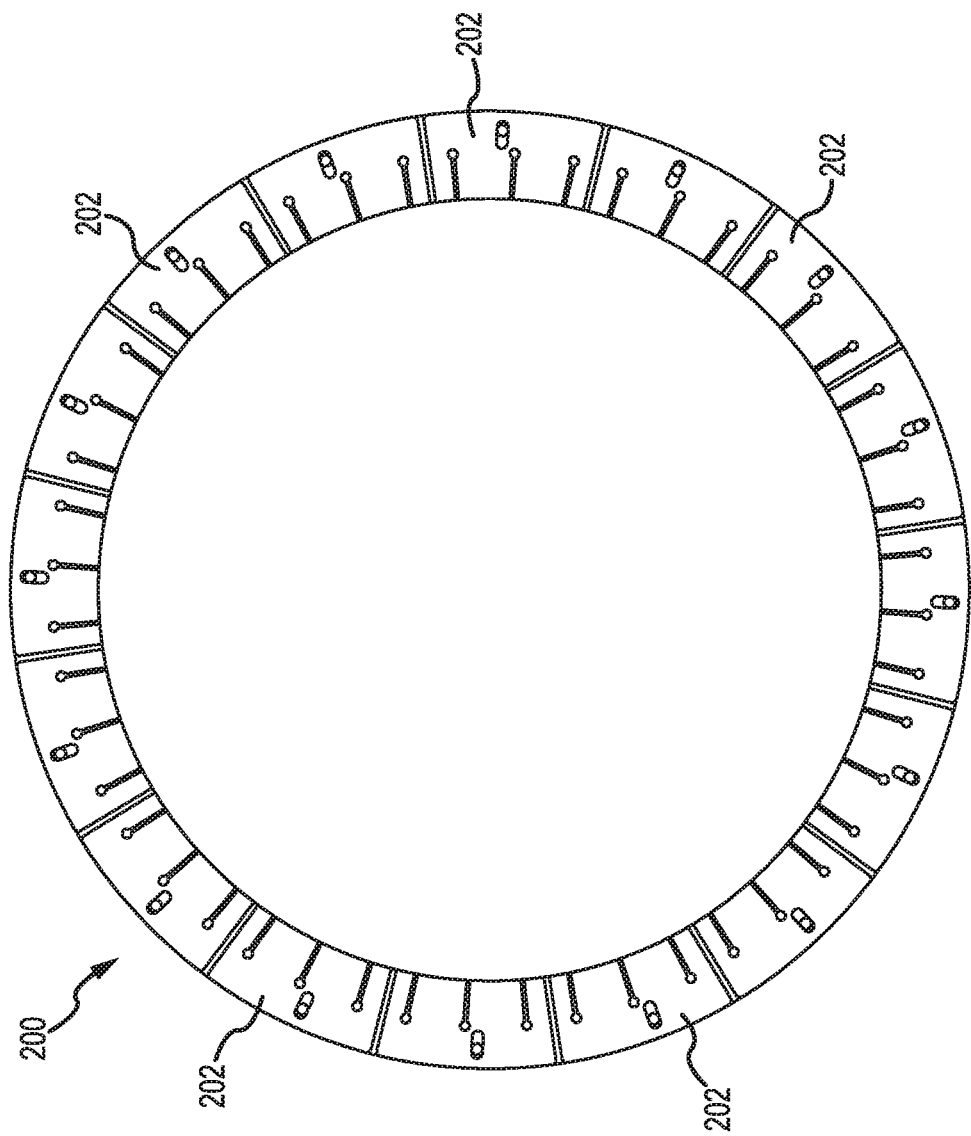

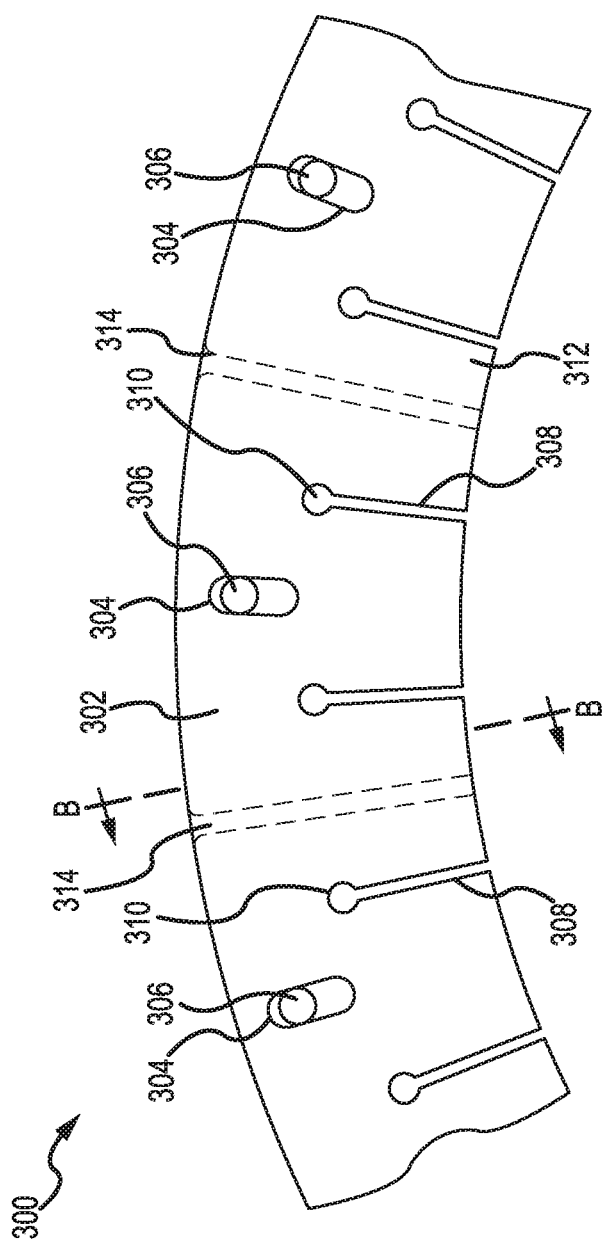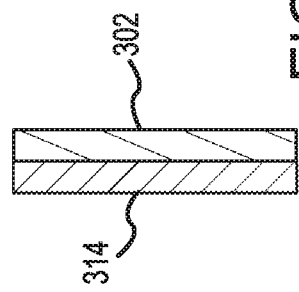

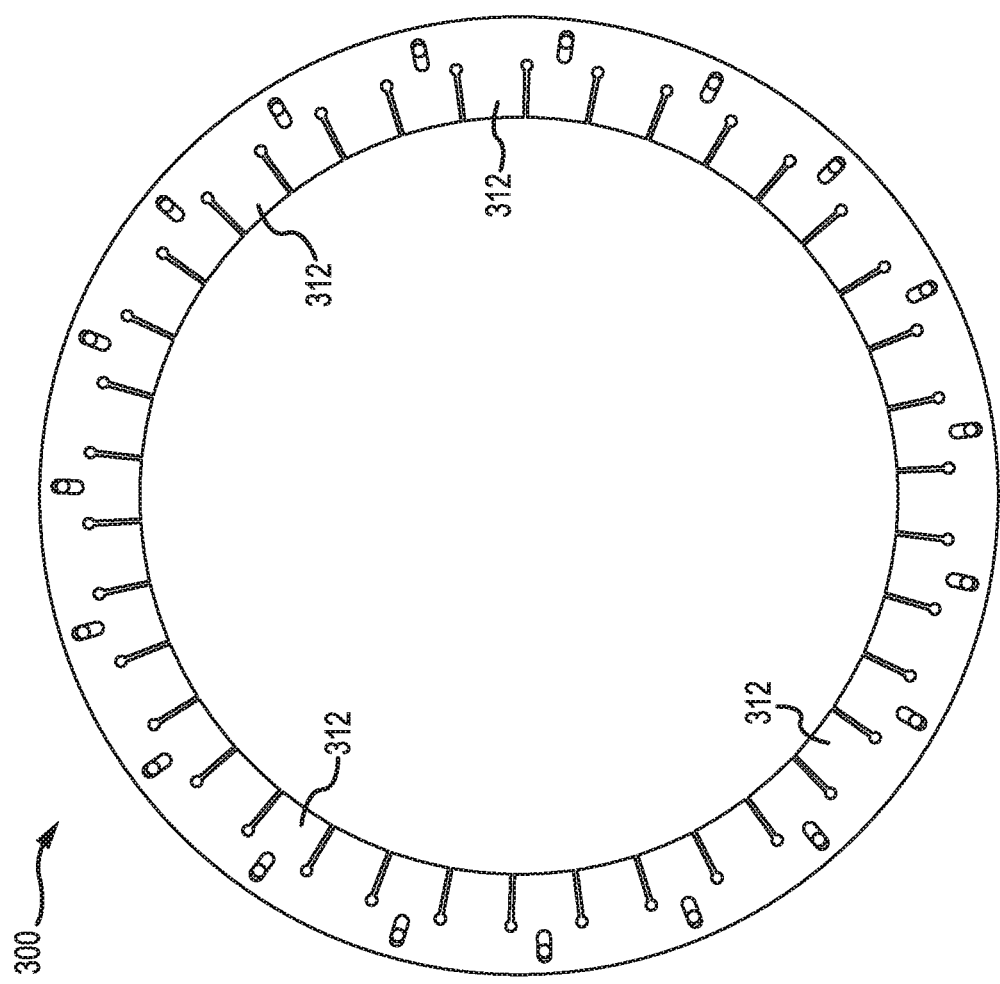

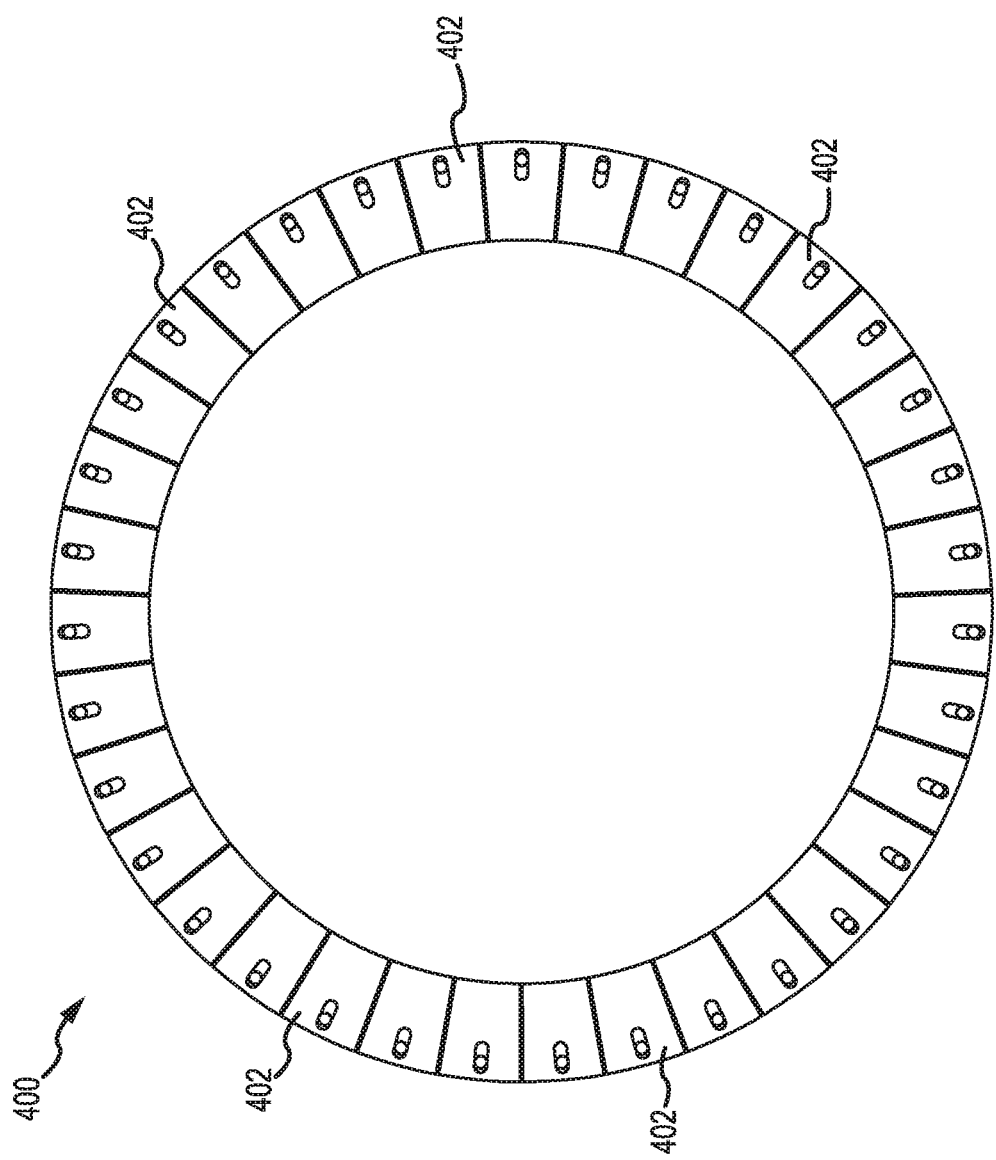

SEAL RING

CROSS-REFERENCE TO RELATED APPLICATIONS

This application is a divisional of, and claims priority to, and the benefit of U.S. Ser. No. 14/852,918 filed on Sep. 14, 2015 and entitled "SEAL RING," which claims priority from Provisional Application No. 62/066,643 filed on Oct. 21, 2014 and entitled "SEAL RING," Each of the aforementioned applications are incorporated herein by reference in their entirety.

FIELD

The present disclosure relates to seals, and, more particularly, to a seal ring for use in a gas turbine engine

BACKGROUND

Gas turbine engines may include both rotating components and static components. In various sections of the engine, static components may be in close proximity to rotating components. Sealing may be desired to prevent air from moving between the rotating and static sections. The seals may be subject to vibration during operation. Furthermore, the seals may be subject to dynamically changing distances between the rotating and static components as the components expand or contract during operation. The vibration and expansion in the seals may reduce the efficacy of the seals and may cause air leakage. Leakage through the seals may lead to degraded fuel efficiency and reduced thrust in gas turbine engines.

SUMMARY

A seal ring system is provided. The seal ring system comprises a segment defining a slot, a pedal along the slot, and an opening offset from the slot. A retention fastener may be disposed in the opening.

In various embodiments, the seal ring system further comprises a plurality of additional segments. The segment and the additional segments may form a first row of segments having an annular shape. The retention fastener may be a retention pin with the segment configured to move in a radial direction relative to the retention pin. A second row of segments may be proximate the first row of segments and staggered with the first row of segments. The slot may include parallel edges and a round feature at a distal end of the slot. The segment may comprise a petal defined by the slot and at least one additional slot defined in the segment. The segment may comprise a thickness less than 0.006 inches.

A seal ring system is also provided comprising a first segment defining a first opening, a second segment defining a second opening, and a retention fastener extending through the first and second openings. The retention fastener configured to allow relative radial movement of the first segment and the second segment.

In various embodiments, the first segment may comprise a thickness less than 0.006 inches. The retention fastener may comprise a retention pin. A spacer may be adjacent the first segment with the retention pin extending from the spacer into the first opening and the second opening. The first segment may further comprise a first slot defined by the first segment and including first parallel edges and a first round feature at a distal end of the first slot. The first segment may also include a second slot defined by the first segment. The second slot may comprise second parallel edges and a second round feature at a distal end of the second slot. A petal may be defined by the first slot and the second slot. The first segment and a plurality of additional first segments may form a first row of segments having a first annular shape. The second segment and a plurality of additional second segments may form a second row of segments having a second annular shape. The second segment may comprise a full ring.

A seal is provided comprising a seal ring having a central axis, a petal extending radially inward with respect to the central axis of the seal ring, and a sealing disk axially proximate the seal ring. The sealing disk may have a seal shoe configured as a primary seal. The petal may extend toward the seal shoe.

In various embodiments, the seal ring may comprise a plurality of separate segments. The seal ring may include a lip configured to engage the seal shoe. The seal shoe may include a pin configured to engage the seal ring.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIG. 2A illustrates a portion of a circular seal ring with overlapping segments, in accordance with various embodiments;

FIG. 2B illustrates a cross sectional view of axially adjacent segments, in accordance with various embodiments;

FIG. 2C illustrates a cross sectional view of axially adjacent segments including a hook end, in accordance with various embodiments;

FIG. 2D illustrates a circular seal ring with overlapping segments, in accordance with various embodiments;

FIG. 3A illustrates a portion of a circular seal ring including a continuous ring with petals extending radially inward, in accordance with various embodiments;

FIG. 3B illustrates a cross sectional view of a full ring seal with an axially adjacent segment, in accordance with various embodiments;

FIG. 3C illustrates a circular seal ring including a continuous ring, in accordance with various embodiments;

FIG. 4B illustrates a circular seal ring with individual petals forming complete segments of the seal ring, in accordance with various embodiments;

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The scope of the disclosure is defined by the appended claims. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As used herein, "distal" refers to the direction radially outward, or generally, away from the axis of rotation of a turbine engine. As used herein, "proximal" refers to a direction radially inward, or generally, towards the axis of rotation of a turbine engine.

Figure 1:
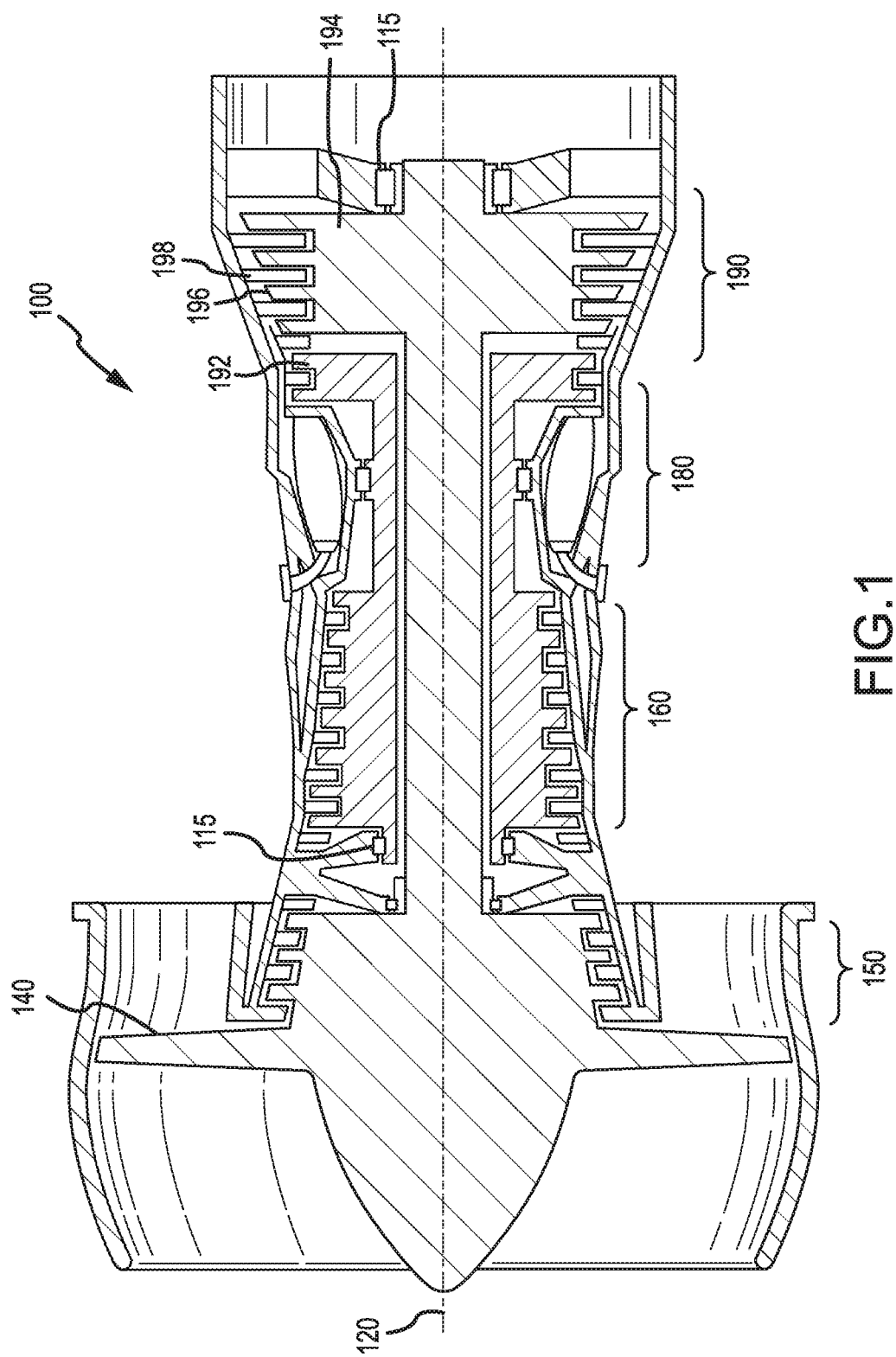
FIG. 1 illustrates a cross-sectional view of an exemplary gas turbine engine, in accordance with various embodiments.

Referring to FIG. 1, a gas turbine engine 100 (such as a turbofan gas turbine engine) is illustrated according to various embodiments. Gas turbine engine 100 is disposed about axial centerline axis 120, which may also be referred to as axis of rotation 120. Gas turbine engine 100 may comprise a fan 140, compressor sections 150 and 160, a combustion section 180, and a turbine section 190. Air compressed in compressor sections 150, 160 may be mixed with fuel and burned in combustion section 180 and expanded across turbine section 190. Fan 140, compressor sections 150 and 160, and turbine section 190 may each contain rotating components that are adjacent to static components. Seals may be used to prevent air flow between rotating and static components.

Turbine section 190 may include high-pressure rotors 192 and low-pressure rotors 194, which rotate in response to the expansion. Turbine section 190 may comprise alternating rows of rotary airfoils or blades 196 and static airfoils or vanes 198. A plurality of bearings 115 may support spools in the gas turbine engine 100. FIG. 1 provides a general understanding of the sections in a gas turbine engine, and is not intended to limit the disclosure. The present disclosure may extend to all types of turbine engines, including turbofan gas turbine engines and turbojet engines, for all types of applications.

The forward-aft positions of gas turbine engine 100 lie along axis of rotation 120. For example, fan 140 may be referred to as forward of turbine section 190 and turbine section 190 may be referred to as aft of fan 140. Typically, during operation of gas turbine engine 100, air flows from forward to aft, for example, from fan 140 to turbine section 190. As air flows from fan 140 to the more aft components of gas turbine engine 100, axis of rotation 120 may also generally define the direction of the air stream flow.

During operation of gas turbine engine 100, a static seal that seals against a rotating component may dynamically respond to radial growth and contraction of the rotating component. The present design provides additional seal flexibility to maintain effective sealing in response to radial growth or contraction of rotating components.

In various embodiments, and with reference to FIGS. 2A-2D, a seal ring 200 (also referred to herein as a 'petal seal ring 200') with petals 214 extending radially inward is shown. Petal seal ring 200 may comprise multiple segments 202 in an annular shape that form a circular, flat ring. Segments 202 may be made of thin metal plates. For example, segments 202 may be made from a metal such as stainless steel, titanium alloys, nickel alloys, or cobalt alloys. For example, in various embodiments, a cobalt-nickel-chromium-tungsten alloy may be used. In particular, in various embodiments, a cobalt-nickel-chromium-tungsten alloy that comprises, by % weight, 51% Co, 10% Ni, 20% Cr, 15% W (available under the trademark HAYNES 25) may be used. Also for example, in various embodiments, a cobalt-nickel-chromium-tungsten alloy that comprises, by % weight, 39% Co, 22% Ni, 22% Cr, 14% W (available under the trademark HAYNES 188) may be used.

In various embodiments, the axial length (i.e., thickness) of each segment 202 may be less than 0.01 inches (0.25 mm). In various embodiments, the axial length of segment 202 may be between 0.003 inches (0.08 mm) and 0.006 inches (0.15 mm). To the extent possible, segments 202 may be made less than 0.003 inches (0.08 mm) thick to minimize leakage. A pressure differential on opposite sides of segments 202 combined with the thin nature of the sheet metal used to make segments 202 creates thin, long flow passages that tend to restrict leakage.

In various embodiments, segment 202 may include define retention opening 204 configured to fix segment 202 circumferentially when fit around retention pin 206. Retention opening 204 may be larger than retention pin 206 in a radial direction to allow segment 202 to move radially inward or radially outward. For example, retention opening 204 may comprise an elongated opening 0.2 inches (0.5 cm) larger than retention pin 206 in the radial direction to allow segment 202 to slide radially inward and/or radially outward 0.1 inches (0.25 cm) from centered on retention pin 206 in the radially inward and outward. In that regard, retention opening 204 may be a racetrack slot (i.e., an elongated, oval shaped opening). Each segment 202 may move radially inward or radially outward independently of other segments 202.

In various embodiments, segment 202 may include slots 208, each having parallel edges extending from a radially outer region of segment 202 to a radially inner edge of segment 202. Edges of petals 214 may define slots 208. Slots 208 may include round feature 210 operatively disposed at the radially outer end of slot 208 to relieve stress at the end of slot 208. In that regard, round feature 210 may relieve stress in slot 208 by forming a keyhole slot. A keyhole slot may be an opening with a round opening at one end of a rectangular slot. As shown, slots 208 may form boundaries between petals 214. Petals 214 may bend in an axial direction to provide flexibility.

In various embodiments, circumferentially adjacent segments 202 of petal seal ring 200 may define a gap 212 therebetween. An overlapping segment 216 may be disposed behind (e.g., axially adjacent) circumferentially adjacent segments 202 and overlap circumferentially adjacent segments 202. Thus, overlapping segments 216 tend to prevent air flow through gap 212. In that regard, a first ring of segments 202 may have adjacent segments aligned circumferentially edge to edge, and a second row of overlapping segments 216 may be axially adjacent to and circumferentially staggered relative to the first row of segments. Overlapping segments 216 may have a retention opening 204 offset from center so that overlapping segment 216 may be mounted on retention pin 206 (further discussed below with respect to FIG. 5, for example) and staggered with respect to segments 202. Thus, any gap between segments 202 may be covered by an overlapping segment 216. Segments 202 may be mounted on retention pins 206 oriented in a circular formation to form petal seal ring 200 in an annular shape.

FIGS. 2B and 2C illustrate a cross section of overlapping segment 216 and segment 202 along the line A-A in both non-hooked and hooked configurations, in accordance with various embodiments. With reference to FIG. 2B, overlapping segment may be axially adjacent segment 202. Segment 202 and overlapping segment 216 may have similar heights and directly contact one another. As shown in FIG. 2C, segments 202 may also comprise a hook 220 or other interface means to cause overlapping segment 216 to move radially outward in response to hook 220 contacting a proximal end of overlapping segment 216.

In various embodiments, and with reference to FIGS. 3A-3C, an exemplary seal ring 300 (also referred to herein as 'petal seal ring 300') with petals 312 extending radially inward is shown. Petal seal ring 300 may comprise a continuous ring 302. Continuous ring 302 may be made from a thin metal plate. For example, continuous ring 302 may be made from a metal such as stainless steel, titanium alloys, nickel alloys, or cobalt alloys. For example, in various embodiments, a cobalt-nickel-chromium-tungsten alloy may be used. In particular, in various embodiments, a cobalt-nickel-chromium-tungsten alloy that comprises, by % weight, 51% Co, 10% Ni, 20% Cr, 15% W (available under the trademark HAYNES 25) may be used. Also for example, in various embodiments, a cobalt-nickel-chromium-tungsten alloy that comprises, by % weight, 39% Co, 22% Ni, 22% Cr, 14% W (available under the trademark HAYNES 188) may be used.

In various embodiments, the axial length (i.e., thickness) of the continuous ring 302 may be less than 0.01 inches (0.25 mm). In various embodiments, the axial length of continuous ring 302 may be between 0.003 inches (0.08 mm) and 0.006 inches (0.15 mm). A pressure differential on opposite sides of full ring combined with the thin nature of the sheet metal used to make continuous ring 302 creates thin, long flow passages that tend to restrict leakage.

In various embodiments, continuous ring 302 may include retention opening 304 to fix continuous ring 302 circumferentially. Retention opening 304 may fit snugly around retention pin 306 in a circumferential direction to prevent continuous ring 302 from moving in a circumferential direction. Retention opening 304 may be larger than retention pin 306 in a radial direction to allow continuous ring 302 to move radially inward or radially outward as continuous ring 302 expands or contracts. For example, retention opening 304 may comprise an elongated opening 0.2 inches (0.5 cm) larger than retention pin 306 in the radial direction to allow continuous ring 302 to slide radially inward and/or radially outward 0.1 inches (0.25 cm) from centered in each direction.

In various embodiments, continuous ring 302 may include slots 308, each having parallel edges extending from a radially outer region of continuous ring 302 to a radially inner edge of continuous ring 302. Slots 308 may have round feature 310 (i.e., an opening having a circular boundary) disposed at the radially outer end of slot 308 to relieve stress at the end of slot 308. In that regard, round feature 310 may relieve stress in slot 308 by forming a keyhole slot. A keyhole slot may be an opening with a round opening at one end of a rectangular slot. Slots 308 may form boundaries between petals 312. Petals 312 may flex in an axial direction to provide flexibility to continuous ring 302.

In various embodiments, overlapping segments 314 (illustrated by broken lines in FIG. 3A) may be axially adjacent continuous ring 302. With reference to FIG. 3B, a cross section of continuous ring 302 axially adjacent overlapping segment 314 along line B-B is shown. Overlapping segment 314 and continuous ring 302 may comprise similar radial lengths and axial lengths. In that regard, overlapping segment 314 and continuous ring 302 may be radially aligned. Overlapping segment 314 and continuous ring 302 may also be in direct contact with one another. Overlapping segment 314 may be engaged with a sealing surface with continuous ring 302 over overlapping segment 314 and pressing overlapping segment 314 into the sealing surface.

Figure 4A:
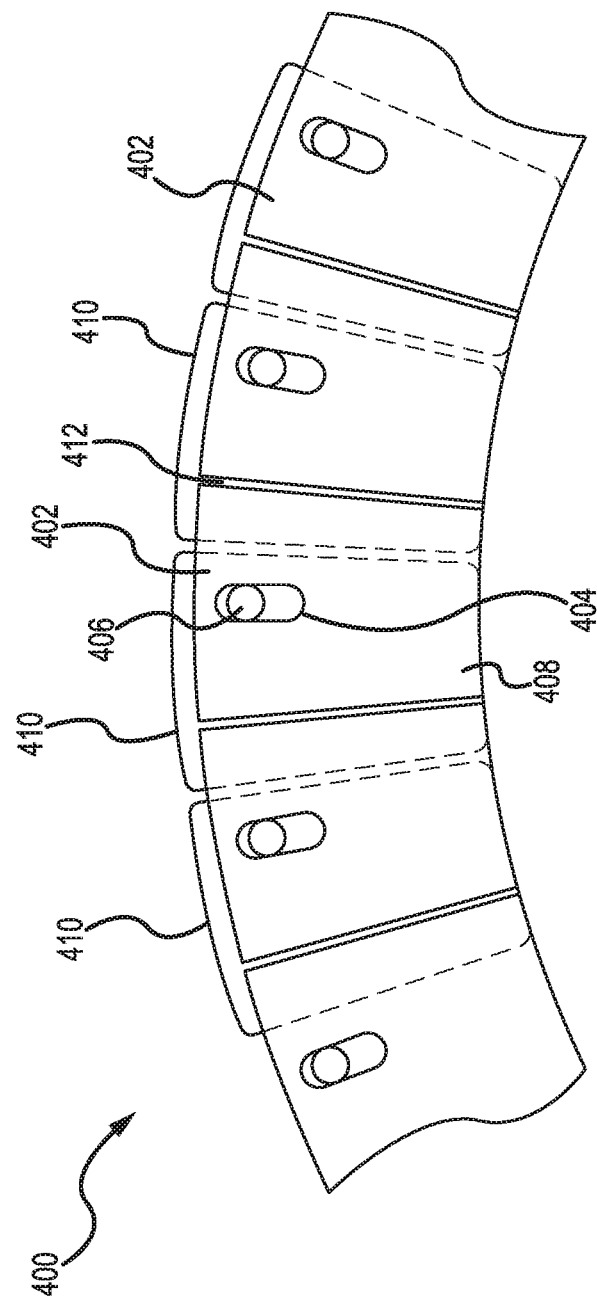
FIG. 4A illustrates an arc of a circular seal ring with individual petals forming complete segments of the seal ring, in accordance with various embodiments.

In various embodiments, and with reference to FIGS. 4A-4B, a seal ring 400 (also referred to herein as 'petal seal ring 400') with segments 402 comprising a single petal 408 is shown. Petal seal ring 400 may comprise multiple segments 402, similar to petal seal ring 200 from FIGS. 2A-2D, with each segment 402 being a single petal 408. Segments 402 may be made of thin metal plates. For example, segments 402 may be made from a metal such as stainless steel, titanium alloys, nickel alloys, or cobalt alloys. For example, in various embodiments, a cobalt-nickel-chromium-tungsten alloy may be used. In particular, in various embodiments, a cobalt-nickel-chromium-tungsten alloy that comprises, by % weight, 51% Co, 10% Ni, 20% Cr, 15% W (available under the trademark HAYNES 25) may be used. Also for example, in various embodiments, a cobalt-nickel-chromium-tungsten alloy that comprises, by % weight, 39% Co, 22% Ni, 22% Cr, 14% W (available under the trademark HAYNES 188) may be used. The axial length (i.e., thickness) of each segment 402 may be less than 0.01 inches (0.25 mm). In various embodiments, the axial length of segment 402 may be between 0.003 inches (0.08 mm) and 0.006 inches (0.15 mm). To the extent possible, thinner segments 402 may tend to minimize leakage.

In various embodiments, segments 402 may define retention opening 404 to fix segment 402 circumferentially when fit snugly around retention pin 406 in a circumferential direction to prevent segment 402 from moving in the circumferential direction. Retention opening 404 may be larger than retention pin 406. For example, retention opening 404 may comprise an elongated opening 0.2 inches (0.5 cm) larger than retention pin 406 in the radial direction to allow segment 402 to slide radially inward and/or radially outward 0.1 inches (0.25 cm) from centered in each direction. Each segment 402 may move radially inward or radially outward independently of other segments 402.

In various embodiments, circumferentially adjacent segments 402 of petal seal ring 200 may define a gap 412 therebetween. An overlapping segment 410 may be disposed behind (e.g., axially adjacent) circumferentially adjacent segments 402. Thus, overlapping segments 410 may overlap adjacent segments 402 to prevent air flow through gap 412. Overlapping segments 410 may have a retention opening 404 offset from center so that overlapping segment 410 may be mounted on retention pin 406 (further discussed below with respect to FIG. 5, for example) and circumferentially staggered with respect to segments 402. Segments 402 may be mounted on retention pins 406 to form petal seal ring 400 in an annular shape.

Figure 5:
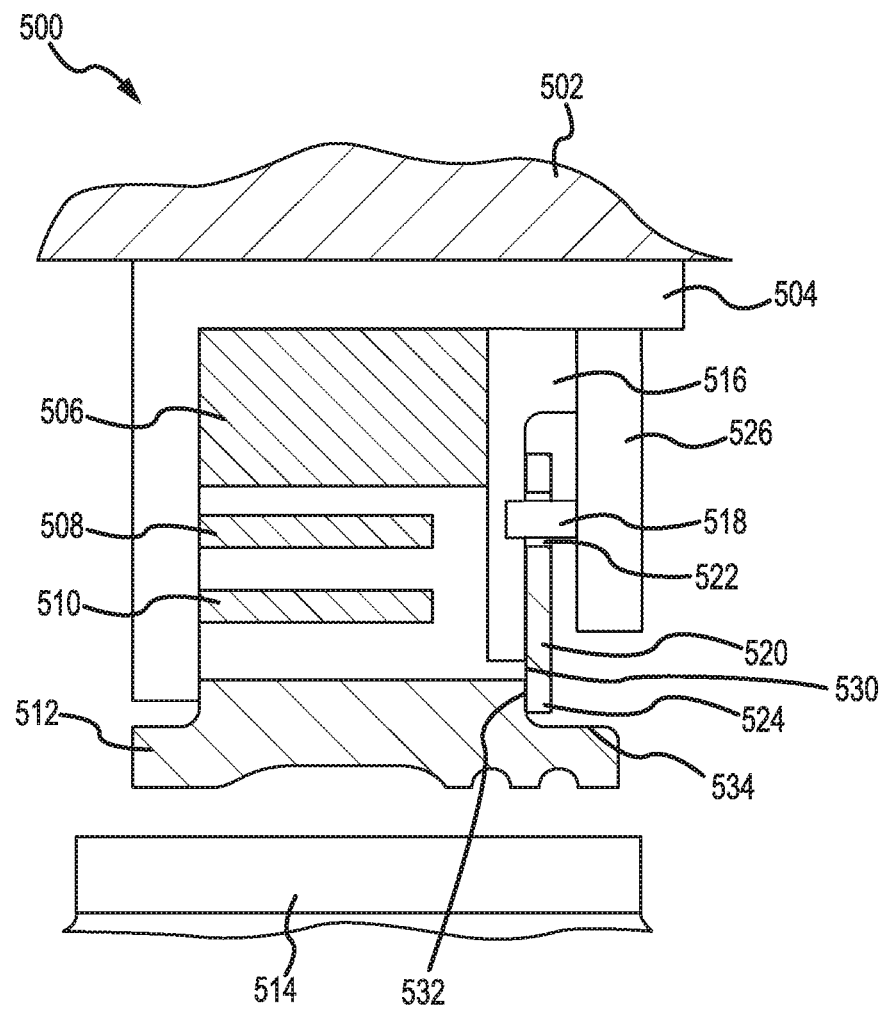
FIG. 5 illustrates a partial cross section of a seal incorporating a seal ring, in accordance with various embodiments.

In various embodiments, with reference to FIG. 5, a seal 500 is shown incorporating seal shoe 512 as a primary seal and seal ring 520 (also referred to herein as 'petal seal ring 520') as a secondary seal. Petal seal ring 520 seals off the openings defined by outer beam 508, inner beam 510, and seal shoe 512 of sealing disk 506. In various embodiments, petal seal ring 520 may be similar to petal seal ring 200 of FIG. 2A, petal seal ring 300 of FIG. 3A, or petal seal ring 400 of FIG. 4A. Seal 500 includes static seal support architecture 502 at a distal end of seal 500. Static seal support architecture 502 holds seal 500 in place and interfaces with secondary static seal support architecture 504.

In various embodiments, a high-pressure side of seal 500 includes spacer 516 radially inward from secondary static seal support architecture 504. Spacer 516 may extend around multiple retention pins 518 that couple segments (as shown by retention pins 206 and segments 202 in FIG. 2A) or a full seal ring (as shown by retention pins 306 and continuous ring 302 of FIG. 3A) to seal 500. Spacer 516 fixes retention pin 518 in place and retention pin 518 interfaces with retention opening 522 of petal seal ring 520. Retention pin 518 may be integral to spacer 516 or received in a grove in 516. A locking feature 526 may hold petal seal ring 520 in place on retention pin 518.

In various embodiments, seal shoe 512, outer beam 508, and inner beam 510 comprise a sealing disk 506. Secondary static seal support architecture 504 may scallop to allow air to pass through sealing disk 506. Air may pass the through sealing disk 506 between outer beam 508 and inner beam 510, and between inner beam 510 and seal shoe 512. Seal shoe 512 is adjacent to rotating component 514 with a corrugated surface of seal shoe 512 limiting air flow between rotating component 514 and seal shoe 512.

In various embodiments, as rotating component 514 expands, seal shoe 512 may move radially outward with the air flowing across the corrugated surface maintaining a small space between rotating component 514 and seal shoe 512. Air flows from a high-pressure side (the right side as illustrated) to a low-pressure side (the left side as illustrated). Petal seal ring 520 may press against spacer 516 to limit leakage through retention opening 522. Petals 524 may extend radially inward from petal seal ring 520 and a surface 530 of petals 524 may contact a radial wall 532 of seal shoe 512. A proximal end of petals 524 may contact outer diameter 534 of seal shoe 512. Petals 524 may flex as seal shoe 512 moves radially outward as a result of vibration or expansion to maintain effective sealing properties while providing flexibility. The pressure differential between high-pressure and low-pressure sides may tend to press petal seal ring 520 against radial wall of seal shoe 512

Figure 6A:
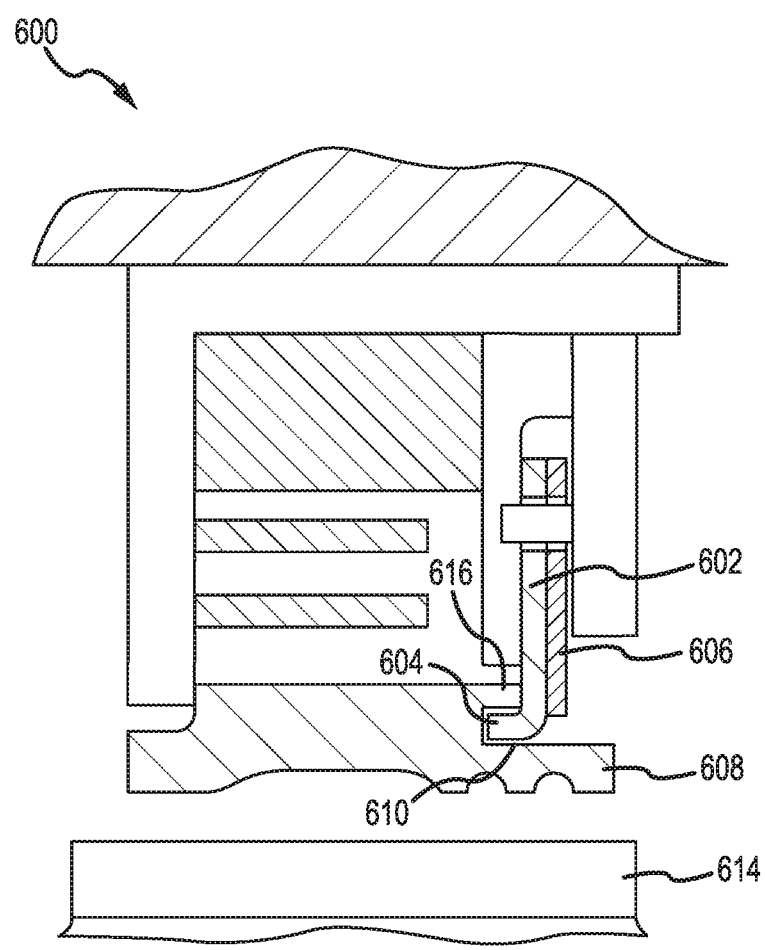
FIG. 6A illustrates a partial cross section of a seal incorporating a seal ring with a hook to interface with a seal shoe, in accordance with various embodiments.
Figure 6B:
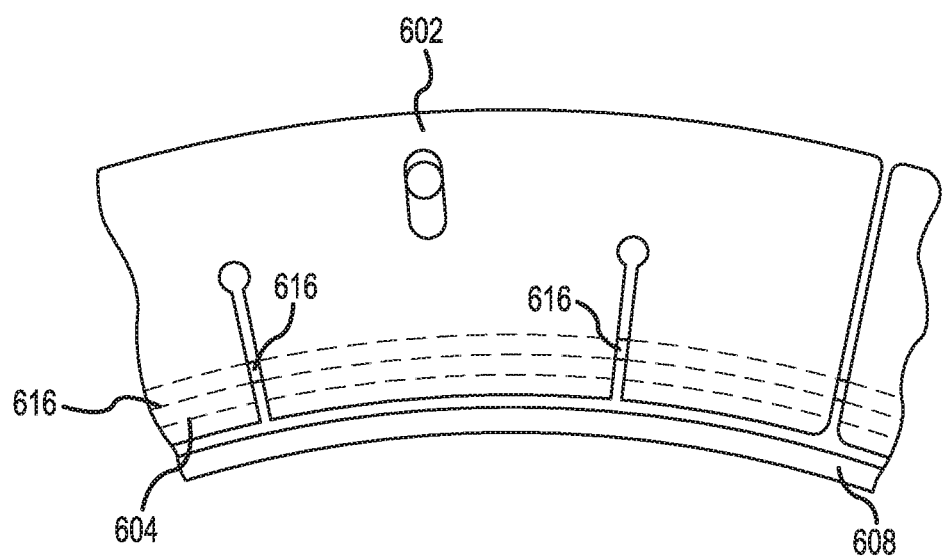
FIG. 6B illustrates a circular seal ring with a hook to interface with a seal shoe, in accordance with various embodiments.

With reference to FIGS. 6A and 6B, a partial cross section of seal 600 is shown. Seal 600 is similar to seal 500 of FIG. 5. Seal 600 comprises a high-pressure-side seal 606 and a low-pressure-side seal 602. Low-pressure-side seal 602 may comprise a lip 604 at a proximal end of low-pressure-side seal 602. Lip 604 may be a protrusion such as a hook, ridge, or bump. Lip 604 may engage with ledge 616 of seal shoe 608 and extend into slot 610 defined by ledge 616 of seal shoe 608. Thus, low-pressure-side seal 602 and high-pressure-side seal 606 may maintain engagement between low-pressure-side seal 602 and seal shoe 608 in response to seal shoe 608 moving radially inward or radially outward. Seal shoe 608 may provide sealing against rotating component 614.

Figure 7A:
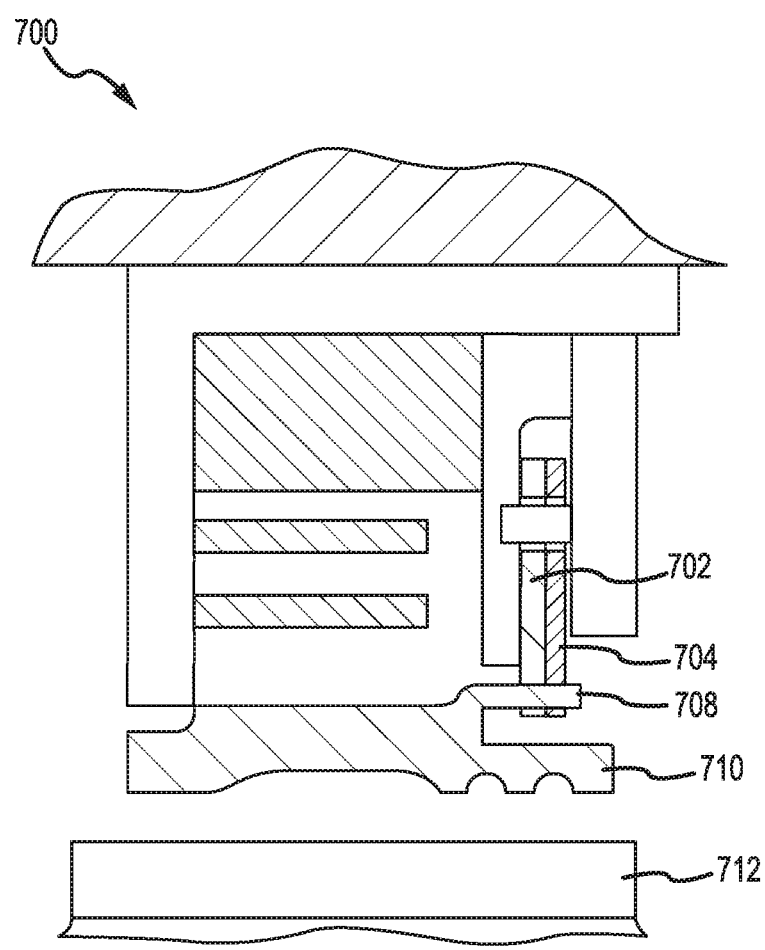
FIG. 7A illustrates a partial cross section of a seal incorporating a pin on a seal shoe to interface with the seal ring, in accordance with various embodiments.
Figure 7B:
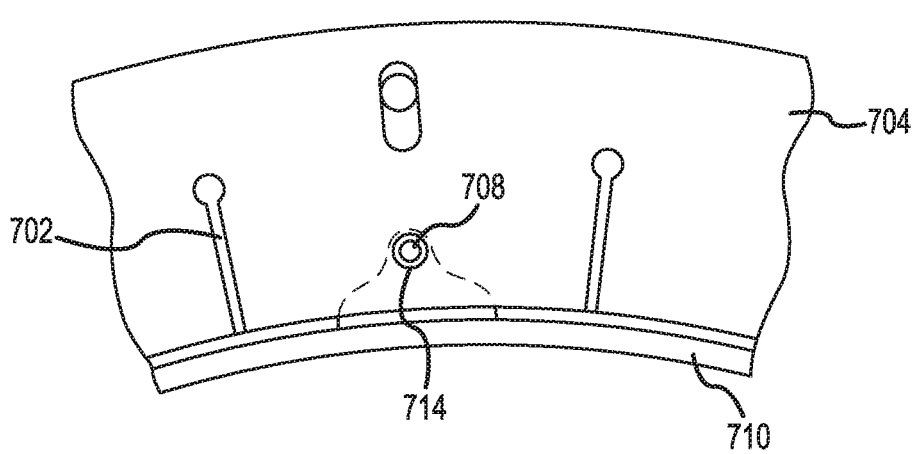
FIG. 7B illustrates a circular seal ring with a pin on a seal shoe to interface with the seal ring, in accordance with various embodiments.

With reference to FIGS. 7A and 7B, a seal 700 is shown. Seal 700 is similar to seal 500 of FIG. 5. Seal 700 comprises a high-pressure-side seal 704 and a low-pressure-side seal 702. Low-pressure-side seal 702 and high-pressure-side seal 704 may define an opening to accept pin 708. Pin 708 protrudes from seal shoe 710. Pin 708 may be integral with seal shoe 710 or may be inserted into a groove in seal shoe 710. The pressure differential tends to keep low-pressure-side seal 702 and high-pressure-side seal 704 engaged on pin 708. Thus, low-pressure-side seal 702 and high-pressure-side seal 704 may maintain engagement with seal shoe 710 in response to seal shoe 710 moving radially inward or radially outward. Seal shoe 710 may provide sealing against rotating component 712.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A seal system for a gas turbine engine, comprising:
a rotating component;
a first seal ring having a first central axis, the first seal ring comprising:
a plurality of segments forming the first seal ring, each segment in the plurality of segments defining a first slot and a second slot, a petal disposed circumferentially between the first slot and the second slot, and an opening that is offset circumferentially from the first slot, each pair of circumferentially adjacent segments in the plurality of segments defining a gap therebetween the petal extending radially inward with respect to the first central axis of the first seal ring;

a second seal ring having a second central axis substantially equal to the first central axis, the second seal ring comprising a lip disposed at a radially inner end of the second seal ring, the lip extending in an axial direction;
a sealing disk comprising a radially outer portion, a seal shoe disposed radially inward from the radially outer portion, and a first beam disposed radially between the radially outer portion and the seal shoe axially proximate the second seal ring and having the seal shoe configured as a primary seal, wherein the petal extends toward the seal shoe, the seal shoe spaced apart radially from the rotating component, the seal shoe defining a third slot extending in the axial direction, the lip extending into the third slot.

2. The seal system of claim 1, wherein the first seal ring is on a high-pressure side in the gas turbine engine and the second seal ring is on a low-pressure side in the gas turbine engine.

3. The seal system of claim 1, wherein the sealing disk further comprises a ledge at least partially defining the third slot.

4. The seal system of claim 1, further comprising a spacer and a locking feature, the spacer disposed axially between the radially outer portion of the sealing disk and the locking feature.

5. The seal system of claim 4, further comprising a retention pin for the opening of each segment in the plurality of segments, the retention pin fixedly coupled to the spacer, extending axially through the opening, and axially restrained by the locking feature.

6. The seal system of claim 5, wherein the retention pin is integral with the spacer.

* * * * *